(12) United States Patent
Johnson et al.

(10) Patent No.: US 6,310,769 B1
(45) Date of Patent: Oct. 30, 2001

(54) MOUNTING BRACKET ASSEMBLY FOR SYSTEM COMPONENTS IN A COMPUTER

(75) Inventors: Robert W. Johnson, Pflugerville; Stephen T. Cook, Georgetown, both of TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/564,054

(22) Filed: May 3, 2000

(51) Int. Cl.[7] ..................................... H05K 5/18
(52) U.S. Cl. ................. 361/683; 361/724; 312/223.2; 248/559
(58) Field of Search ........................ 361/683–686, 361/724–727, 740, 759; 364/708.1; 248/551–553, 559, 560, 561; 312/216, 218; 70/57–58, 85; 292/42, 148, 151, 307 R

(56) References Cited

U.S. PATENT DOCUMENTS

| | | | |
|---|---|---|---|
| 3,640,836 | 2/1972 | Oberst et al. | 161/165 |
| 4,403,762 | * 9/1983 | Cogswell, II et al. | 248/559 |
| 4,678,707 | 7/1987 | Shinozaki et al. | 428/323 |
| 4,705,257 | 11/1987 | Leo et al. | 248/611 |
| 4,778,028 | 10/1988 | Staley | 181/208 |
| 4,833,554 | 5/1989 | Dalziel et al. | 360/98.04 |
| 4,851,271 | 7/1989 | Moore, III et al. | 428/34.5 |
| 4,979,909 | 12/1990 | Andrews | 439/352 |
| 5,063,098 | 11/1991 | Niwa et al. | 428/76 |
| 5,123,721 | 6/1992 | Seo | 312/333 |
| 5,136,468 | 8/1992 | Wong et al. | 361/683 |
| 5,149,048 | 9/1992 | Morehouse et al. | 248/632 |
| 5,213,879 | 5/1993 | Niwa et al. | 428/213 |
| 5,216,582 | 6/1993 | Russell et al. | 361/685 |
| 5,232,785 | 8/1993 | Kita | 428/457 |
| 5,277,615 | 1/1994 | Hastings et al. | 439/377 |
| 5,306,079 | 4/1994 | Liu | 312/223.2 |
| 5,338,599 | 8/1994 | Barrett | 428/212 |
| 5,463,527 | 10/1995 | Hager et al. | 361/685 |
| 5,483,397 | 1/1996 | Gifford et al. | 360/97.01 |
| 5,495,586 | * 2/1996 | Adachi et al. | 395/280 |
| 5,535,092 | 7/1996 | Bang | 361/685 |
| 5,564,804 | 10/1996 | Gonzalez et al. | 312/223.2 |
| 5,572,402 | 11/1996 | Jeong | 361/685 |
| 5,587,855 | 12/1996 | Kim | 360/97.01 |
| 5,631,451 | 5/1997 | Torisaka et al. | 181/207 |
| 5,695,867 | 12/1997 | Saitoh et al. | 428/219 |
| 5,703,734 | 12/1997 | Berberich et al. | 360/97.02 |
| 5,706,168 | 1/1998 | Erier et al. | 361/685 |
| 5,734,557 | 3/1998 | McAnally et al. | 361/727 |
| 5,760,998 | 6/1998 | Berberich et al. | 360/97.02 |
| 5,808,864 | 9/1998 | Jung | 361/685 |
| 5,828,547 | 10/1998 | Francovich et al. | 361/685 |
| 5,831,821 | * 11/1998 | Scholder et al. | 361/686 |
| 5,842,686 | 12/1998 | Hansen et al. | 267/140 |
| 5,995,364 | 11/1999 | McAnally et al. | 361/685 |
| 6,053,586 | * 4/2000 | Cook et al. | 312/223.2 |

* cited by examiner

Primary Examiner—Gerald Tolin
Assistant Examiner—Hung Van Duong
(74) Attorney, Agent, or Firm—Haynes and Boone, L.L.P.

(57) ABSTRACT

An apparatus for mounting a component in a computer includes a computer chassis and a mounting bracket assembly attached to the computer chassis. The mounting bracket assembly includes a first structural layer, a second structural layer spaced apart from the first structural layer wherein a gap is defined therebetween, and a layer of damping material disposed in at least a portion of the gap. The mounting bracket assembly is useful in space-sensitive applications while still providing vibration and acoustical noise attenuation. Furthermore, the mounting bracket assembly provides a nominal degree of impact damping during installation of a system component, reducing the potential for impact related failures.

20 Claims, 4 Drawing Sheets

MOUNTING BRACKET ASSEMBLY FOR SYSTEM COMPONENTS IN A COMPUTER

BACKGROUND

The disclosures herein relate generally to mounting bracket assemblies. More particularly, the disclosures herein relate to vibration damping mounting bracket assemblies for system components in a computer.

Some system components, such as high performance hard drives, require rigid mounting to the chassis of a computer system to achieve optimum performance. The servo tracking performance of a hard drive is hindered by displacement of the disk drive unit in response to inertial forces associated with movement of the head actuator arms. Reducing, or preferably, eliminating movement of the disk drive body relative to the chassis of the computer system allows a desired string of data to be read from the disk drive more readily and accurately.

The force associated with mounting the disk drive against a rigid surface in a high-speed computer assembly operation can result in high G-load impacts. If the impact is great enough, one or more of the heads in the disk drive may experience an impact-induced head crash. An impact-induced head crash occurs when one or more of the heads in the disk drive collide against the surface of an adjacent disk. A head crash may damage the head or the disk, resulting in reduced performance and reliability. The damage may result in immediate failure or undetected damage leading to a shortened operating life.

Conventional mounting techniques associated with high performance hard disk drives result in undesired levels of audible acoustic noise emitted from the hard disk drive. The cost associated with technical support calls and field replacements relating to acoustic noise adversely affects profitability and productivity. Furthermore, an increasing number of customers have implemented a side-by-side comparison of competing products when making purchasing decisions. In such cases, excess acoustic noise can become an obstacle to attracting the business of certain customers.

U.S. Pat. No. 5,706,168 discloses a portable personal computer configured for rugged use. The computer has an impact attenuating case, a sealed keyboard, and a sealed mouse which facilitate use of the computer in harsh environments. The case has an impact attenuating covering. A hard drive is housed in the case on resilient grommets, reducing impact induced shock and acoustic noise.

U.S. Pat. No. 5,463,527 discloses a disk drive support system including a disk drive suspended within a sleeve-like support housing. The disk drive is suspended from two upper corners and two lower corners using four elastomeric mounts bridging the drive and housing at each corner. Each mount has one zone affixed to the drive and another opposite zone affixed to the housing by tangs on the drive and housing which engage two respective slots in the mount. Shock absorber pads are provided on the disk drive which are separated from the housing by an air space so as to absorb shocks but not transmit vibrations. The two upper elastomeric mounts are of a higher durometer hardness than the two lower elastomeric mounts.

U.S. Pat. No. 5,149,048 discloses a shock absorbent jacket for mounting a disk drive or other component in a computer. The jacket is received in a cavity or recess in a computer. The cavity is sized and shaped in such a way that the jacket is loosely held between the surface of the component and the inner surface of the cavity. The cavity itself may be completely enclosed, or it may have various openings. For example, it may take the form of a cage or lattice arrangement on one or more sides. It is essential, however, that the surfaces which define the cavity be positioned so that they function cooperatively with the shock absorbent jacket to protect the disk drive or other component from shocks in any direction.

It is known in the industry that vibration associated with rotating parts within a hard drive is a significant source of noise generated by a hard disk drive. Mounting devices for damping vibrations often require a significant amount of additional space. In many computers such as workstations, space is very limited. As a result, the space and mounting requirements preclude many conventional vibration damping solutions from being used.

Accordingly, what is needed is a system component mounting apparatus that absorbs vibrations, that attenuates acoustical noise, that meets the mounting requirements of high performance system components, and that can be used in applications with limited space.

SUMMARY

One embodiment, accordingly, provides a low profile system component mounting apparatus that includes spaced apart structural layers having a layer of damping material disposed therebetween. To this end, a mounting apparatus for use in a computer system includes a computer chassis and a mounting bracket assembly configured to be attached to the computer chassis for supporting a computer component. The mounting bracket assembly includes a first structural layer, a second structural layer spaced apart from the first structural layer wherein a gap is defined therebetween, and a layer of damping material disposed in at least a portion of the gap.

A principal advantage of this embodiment is that the bracket assembly is useful in space-sensitive applications while still providing vibration and acoustical noise attenuation.

BRIEF DESCRIPTION OF THE DRAWING FIGURES

DETAILED DESCRIPTION

Figure 1:
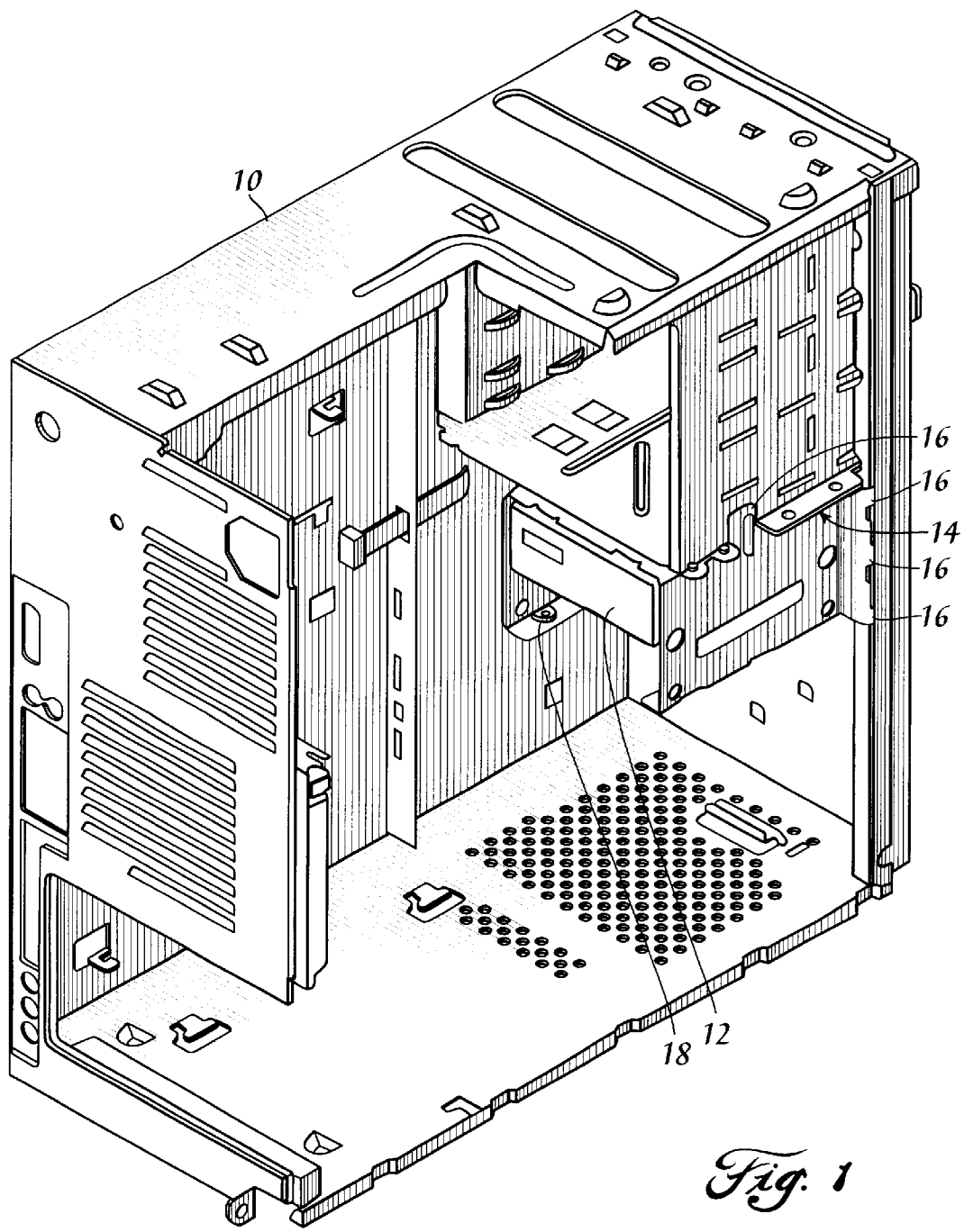
FIG. 1 is a perspective view illustrating an embodiment of an apparatus for mounting a system component in a chassis.

An embodiment of a chassis 10 having a system component 12 mounted thereon is illustrated in FIG. 1. The system component 12 may be mounted in a generally horizontal orientation, as illustrated in FIG. 1, or in other orientations, such as a generally vertical orientation. Examples of the system component 12 include hard drives, CD-ROM drives and the like. The system component 12 is mounted on the chassis 10 through a mounting bracket assembly 14.

Figure 2:
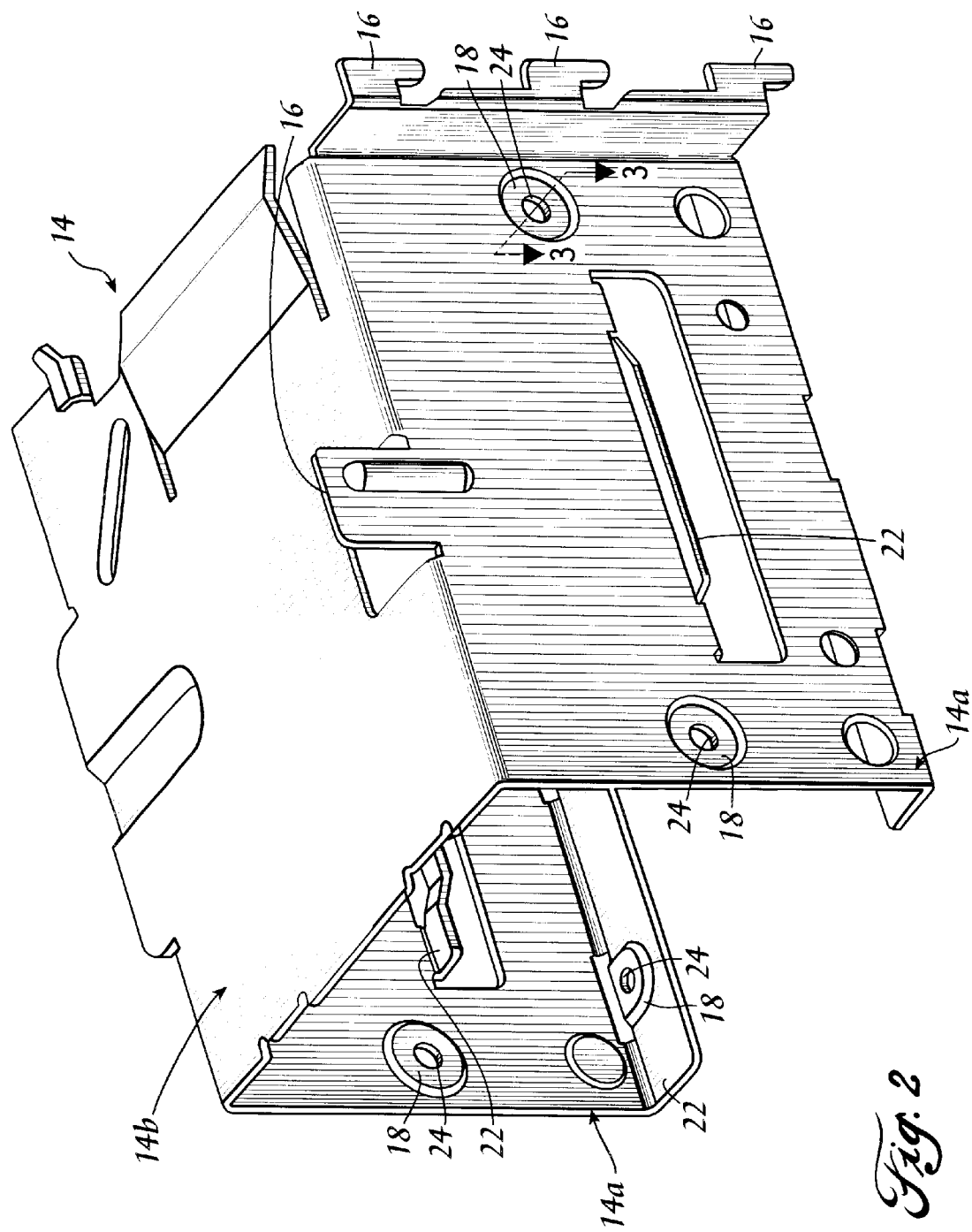
FIG. 2 is a perspective view illustrating an embodiment of a system component mounting bracket assembly.

As illustrated in FIG. 2, the mounting bracket assembly 14 includes two spaced apart main walls 14a and a support wall 14b attached therebetween. The mounting bracket assembly 14 includes a plurality of hook shaped chassis mounting members 16, a plurality of system component mounting members 18 and a plurality of support flanges 22. The chassis mounting members 16 are configured for being attached to mating portions of the chassis 10. Each one of the system component mounting members 18, such as bosses, have a corresponding mounting hole 24 extending therethrough for facilitating the mounting of the system component 12 to the mounting bracket assembly 14. The support flanges 22 aid in supporting the system component 12 during assembly and use thereof.

Figure 3:
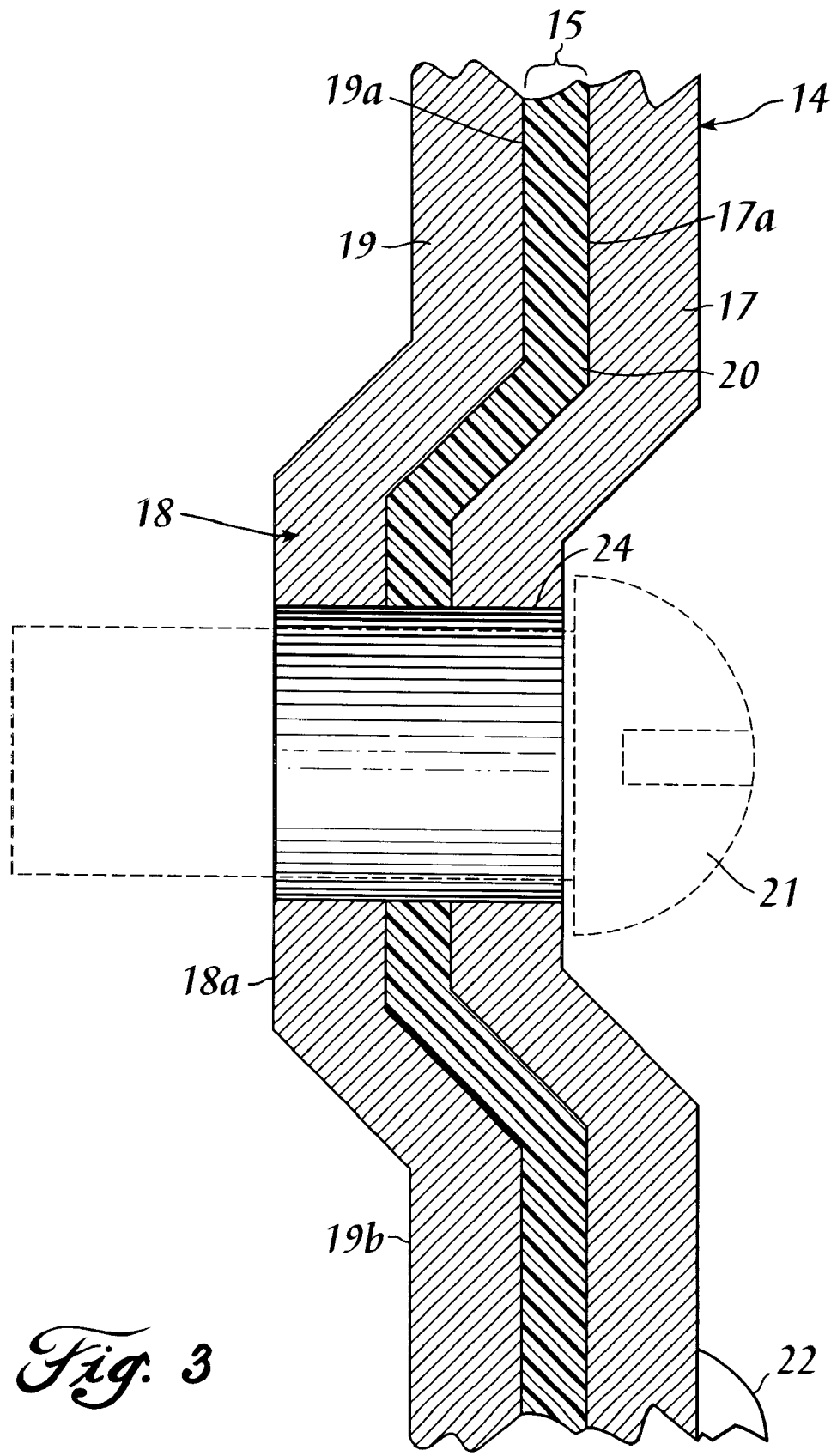
FIG. 3 is a cross sectional view taken along the line 3—3 in FIG. 2.

Referring now to FIG. 3, the mounting bracket assembly 14 includes a first structural layer 17 and a second structural layer 19 spaced apart from the first structural layer 17. A first surface 17*a* of the first structural layer 17 opposes a first surface 19*a* of the second structural layer 19 whereby a gap 15 is defined therebetween. A damping layer 20 is disposed in at least a portion of the gap 15 and is bonded to the first surfaces 17*a*, 19*a* of the first structural layer 17 and the second structural layer 19, respectively. Each system component mounting member 18 defines a corresponding mounting surface 18*a* that is substantially offset from a second surface 19*b* of the second structural layer 19. The mounting surface 18*a* of each system component mounting member 18 engages a corresponding surface of the system component 12, see also FIG. 1. A fastener 21, received by mounting hole 24, may be used to secure component 12 adjacent mounting surface 18*a* of mounting bracket assembly 14.

In the embodiment of the mounting bracket assembly 14 illustrated, FIG. 3, the first structural layer 17 has generally the same shape as the second structural layer 19. Each portion of the first structural layer 17 is substantially aligned with a corresponding portion of the second structural layer 19. In other embodiments (not shown), the first structural layer 17 may have a shape substantially different from the second structural layer 19. Depending on the needs of a particular application, the damping layer 20 may be disposed in a substantially entire portion of the gap 15 or in selected portions of the gap 15.

Laminate materials suitable for forming the mounting bracket assembly 14 are commercially available and may be formed into the mounting bracket assembly 14 using known process such as stamping and metal forming. An example of such a material is offered by Material Sciences Corporation under the tradename Polycore Composite. This laminate material includes spaced apart structural layers with a thin layer of energy absorbing material disposed therebetween. The structural layers of the laminate material correspond to the first structural layer 17 and the second structural layer 19 of the mounting bracket assembly 14 and are typically made of a metallic material such as, for example, steel or aluminum. The layer of energy absorbing material corresponds to the damping layer 20 of the mounting bracket assembly 14 and is typically made of a commercially available elastomeric material such as, for example, Neoprene rubber.

The damping layer 20 between the first structural layer 17 and the second structural layer 19 dissipates energy associated with vibrations and acoustic noise. In doing so, vibrations and noise transmitted from the system component 12 to the chassis 10 are reduced. Furthermore, acoustic noise transmitted into the ambient environment surrounding the chassis 10 is also reduced.

Vibrations applied to the mounting bracket assembly 14 from the system component 12, FIG. 1, cause the layer of damping material 20, FIG. 3, material to flex slightly, shearing the layer damping material 20. The shearing action transforms the vibrational energy into a small amount of heat.

The laminate material described herein is well suited for use in construction of hard drive brackets for computer chassis. It dissipates vibrational energy created by the system component 12 without significantly reducing the heat dissipating functionality afforded by the mounting bracket assembly 14. Furthermore, the laminate material does not adversely affect the spaced requirements for the mounting bracket assembly 14 or for the system component 12.

As an added benefit, the construction of the mounting bracket assembly 14 disclosed herein provides an increased level of protection for the system component 12 during shock and vibration events. The layer of damping material 20 serves to dissipate shocks to the system component 12 during assembly, shipping and use. Accordingly, the potential for damage to the system component 12 during assembly, shipping and use is reduced.

Figure 4:
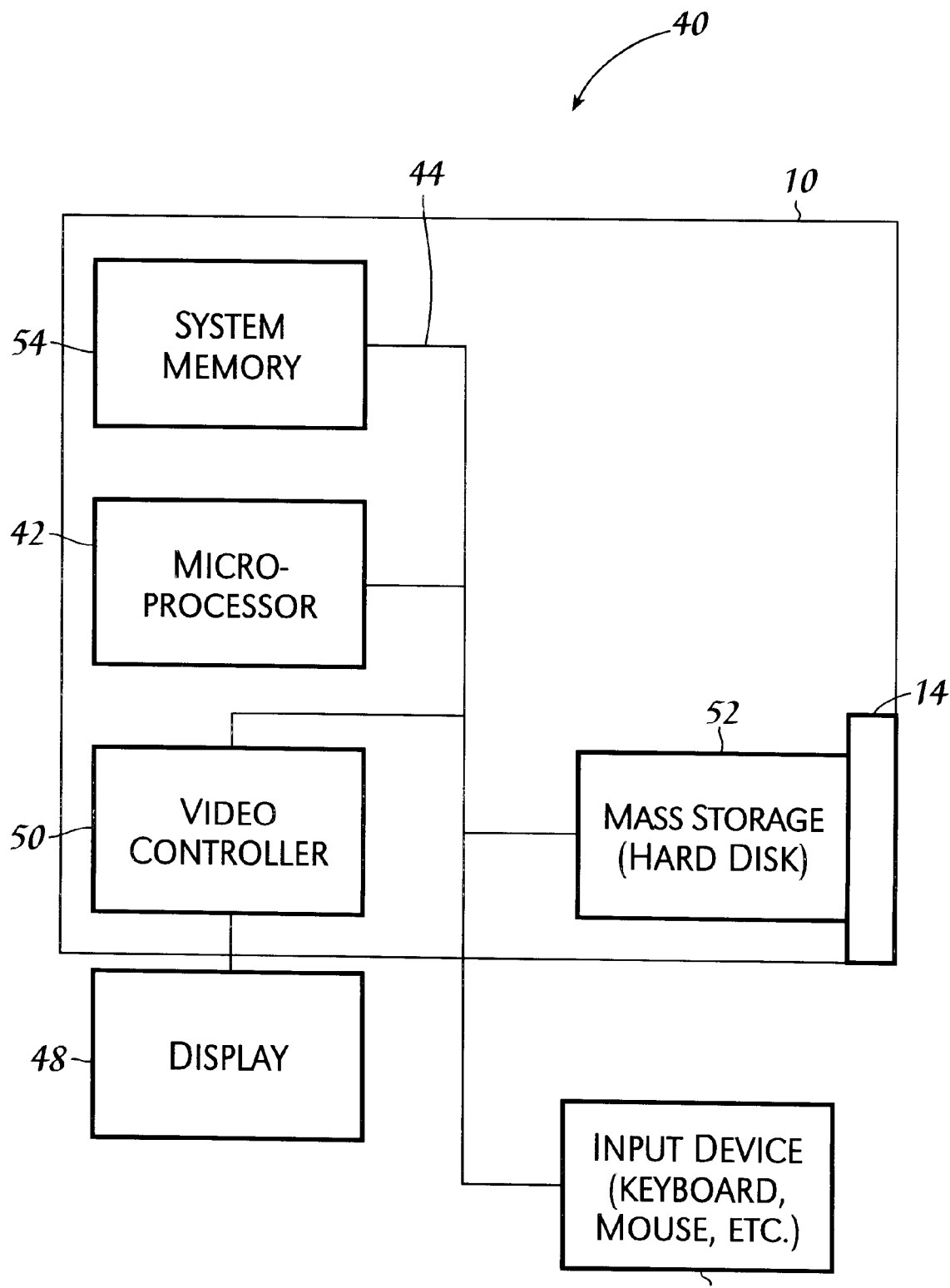
FIG. 4 is a block diagram view illustrating an embodiment of a computer system having a mass storage device mounted on the chassis through a system component mounting bracket.

An embodiment of a computer system 40 is illustrated in FIG. 4. A microprocessor 42 is connected to a bus 44 which serves as a connection between the microprocessor 42 and other components of the computer system 40. An input device 46 is coupled to the microprocessor 42 to provide input to the microprocessor 42. Examples of input devices include keyboards, touchscreens, and pointing devices such as a mouse, a trackball and a trackpad. The computer system 40 may also include a display 48 which is coupled to the microprocessor 42 typically by a video controller 50. Programs and data are stored on a mass storage device 52 which is coupled to the microprocessor 42. The mass storage device 52 which may include component 12, is attached to the chassis 10 through the mounting bracket assembly 14. The chassis 10 and the mounting bracket assembly 14 are discussed above in reference to FIGS. 1–3. Mass storage devices include components such as hard disks, optical disks, magneto-optical drives, floppy drives, and the like. A system memory 54 provides the microprocessor 42 with fast storage to facilitate execution of computer programs by the microprocessor 42. It should be understood that other busses and intermediate circuits can be employed between the components described above and microprocessor 42 to facilitate interconnection between the components and the microprocessor 42.

As a result, one embodiment provides a mounting apparatus for use in a computer system including a computer chassis and a mounting bracket assembly configured to be attached to the computer chassis for supporting a computer component. The mounting bracket assembly includes a first structural layer, a second structural layer spaced apart from the first structural layer wherein a gap is defined therebetween, and a layer of damping material disposed in a portion of the gap.

Another embodiment provides a computer system including a computer chassis and a mounting bracket assembly attached to the computer chassis. The mounting bracket assembly includes a first structural layer, a second structural layer spaced apart from the first structural layer wherein a gap is defined therebetween, and a layer of damping material disposed in at least a portion of the gap. A microprocessor is mounted on the chassis. A system memory is coupled to provide storage to facilitate execution of computer programs by the microprocessor. An input is coupled to provide input to the microprocessor and a display is coupled to the microprocessor by a video controller. A mass storage is coupled to the microprocessor and is attached to the mounting bracket assembly.

A further embodiment provides a method of mounting a component in a computer system. The method includes providing a computer chassis and providing a multi-layer laminate substrate including a layer of damping material bonded between spaced apart structural layers. The laminate substrate is formed into a mounting bracket including spaced apart main walls and a support wall extending therebetween. A chassis mounting member is formed on the bracket. A component mounting member is formed on the bracket. The bracket is attached to the chassis and the component is mounted on the bracket.

As it can be seen, the embodiments disclosed herein provide several advantages. The bracket assembly can be used in space-sensitive applications while still providing vibration and acoustical noise attenuation. The bracket assembly requires little or no modifications to existing chassis and system component designs. The bracket assembly provides a nominal degree of heat dissipation from each system component mounted thereon. The bracket assembly provides a nominal degree of impact damping during assembly, shipping and use of the system component, reducing the potential for impact related failures.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A mounting apparatus for use in a computer system, comprising:
   a computer chassis; and
   a mounting bracket assembly configured to be attached to the computer chassis for supporting a computer component, the mounting bracket assembly including a first structural layer, a second structural layer spaced apart from the first structural layer wherein a gap is defined therebetween, and a layer of damping material disposed in a portion of the gap, a microprocessor mounted on the chassis, a system memory coupled to provide storage to facilitate execution of the computer programs by the microprocessor.

2. The apparatus of claim 1, further comprising:
   a system component mounting member on one of the structural layers of the mounting bracket assembly.

3. The apparatus of claim 1 wherein the layer of damping material is disposed continuously within the gap.

4. The apparatus of claim 1, further comprising:
   a chassis mounting member on one of the structural layers.

5. The apparatus of claim 1 wherein the first structural layer has generally the same overall shape as the second structural layer.

6. The apparatus of claim 1 wherein the layer of damping material is formed of a compliant material.

7. The apparatus of claim 1 wherein the first structural layer includes two spaced apart main walls and a support wall attached therebetween.

8. The apparatus of claim 1 wherein the layer of damping material is bonded to each one of the brackets.

9. The apparatus of claim 1, further comprising:
   a plurality of support flanges attached to the bracket assembly, some of the support flanges including a component mounting boss formed thereon.

10. The apparatus of claim 2 wherein the system component mounting member includes a substantially aligned raised portion in the first and the second structural layers.

11. The apparatus of claim 6 wherein the layer of damping material is formed of a vibration damping material.

12. The apparatus of claim 7 wherein the second structural layer has generally the same overall shape as the first structural layer, each wall of the second structural layer substantially aligned with a corresponding wall of the first structural layer.

13. The apparatus of claim 7, further comprising:
   a plurality of chassis mounting members attached to the mounting bracket assembly; and
   a plurality of component mounting members attached to the mounting bracket assembly.

14. The apparatus of claim 10 wherein the raised portion of the system component mounting member defines a mounting surface, the mounting surface being offset from a surface of the system component mounting bracket assembly.

15. The apparatus of claim 14, wherein the raised portion of the system component mounting member includes an aperture formed therein.

16. A computer system, comprising:
   a computer chassis;
   a mounting bracket assembly attached to the computer chassis, the mounting bracket assembly including a first structural layer, a second structural layer spaced apart from the first structural layer wherein a gap is defined therebetween, and a layer of damping material disposed in at least a portion of the gap;
   a microprocessor mounted on the chassis;
   a system memory coupled to provide storage to facilitate execution of computer programs by the microprocessor;
   an input coupled to provide input to the microprocessor;
   a display coupled to the microprocessor by a video controller; and
   a mass storage coupled to the microprocessor and attached to the mounting bracket assembly.

17. A method of mounting a component in a computer system, comprising the steps of:
   providing a computer chassis;
   providing a multi-layer laminate substrate including a layer of damping material bonded between spaced apart structural layers;
   forming the laminate substrate into a mounting bracket including spaced apart main walls and a support wall extending therebetween;
   forming a chassis mounting member on the bracket;
   forming a component mounting member on the bracket;
   attaching the bracket to the chassis; and
   mounting the component on the bracket.

18. The method of claim 17 wherein the step of forming the chassis mounting member includes the step of extending a plurality of hook shaped members from the bracket.

19. The method of claim 17 wherein the step of forming the component mounting member includes the step of forming a plurality of raised bosses on the bracket.

20. The method of claim 19 wherein the step of forming the component mounting members includes the steps of extending a plurality of support flanges from the bracket and forming the raised bosses on some of the support flanges and on the walls of the bracket.

* * * * *